United States Patent

Itoh

(10) Patent No.: US 10,305,187 B2
(45) Date of Patent: May 28, 2019

(54) ANTENNA DEVICE, COMMUNICATION APPARATUS, AND METHOD OF MANUFACTURING ANTENNA DEVICE

(71) Applicant: Naohiro Itoh, Hyogo (JP)

(72) Inventor: Naohiro Itoh, Hyogo (JP)

(73) Assignee: Ricoh Company, Ltd., Tokyo (JP)

(*) Notice: Subject to any disclaimer, the term of this patent is extended or adjusted under 35 U.S.C. 154(b) by 14 days.

(21) Appl. No.: 15/459,512

(22) Filed: Mar. 15, 2017

(65) Prior Publication Data

US 2017/0271766 A1 Sep. 21, 2017

(30) Foreign Application Priority Data

Mar. 18, 2016 (JP) ................. 2016-055105

(51) Int. Cl.
*H01Q 7/06* (2006.01)
*H01Q 1/12* (2006.01)
*H04B 5/00* (2006.01)

(52) U.S. Cl.
CPC ............. *H01Q 7/06* (2013.01); *H01Q 1/12* (2013.01); *H04B 5/0081* (2013.01)

(58) Field of Classification Search
CPC .. H01Q 7/06–7/08; H01Q 7/00; H04B 5/0081

USPC .................................................. 343/788, 866
See application file for complete search history.

(56) References Cited

U.S. PATENT DOCUMENTS

| | | | |
|---|---|---|---|
| 9,160,059 B2* | 10/2015 | Yosui | G06K 7/10336 |
| 9,768,509 B2* | 9/2017 | Tanaka | H01Q 7/00 |
| 2007/0091007 A1* | 4/2007 | Sako | H01Q 1/40 343/788 |
| 2008/0030423 A1* | 2/2008 | Shigemoto | H01Q 1/3241 343/872 |
| 2013/0154891 A1* | 6/2013 | Kubo | G06K 19/07779 343/788 |
| 2016/0028160 A1* | 1/2016 | Otsuki | H01Q 21/24 343/788 |
| 2017/0229777 A1* | 8/2017 | Kim | H01Q 1/243 |

FOREIGN PATENT DOCUMENTS

| | | |
|---|---|---|
| JP | 2006-269164 | 10/2006 |
| JP | 2014-195137 | 10/2014 |
| JP | 2014-195138 | 10/2014 |

* cited by examiner

*Primary Examiner* — Dameon E Levi
*Assistant Examiner* — Hasan Z Islam
(74) *Attorney, Agent, or Firm* — Oblon, McClelland, Maier & Neustadt, L.L.P.

(57) ABSTRACT

An antenna device includes: a plated magnetic body; a conductive wire that is wound around the magnetic body; and a substrate that relays the conductive wire and a connector.

8 Claims, 3 Drawing Sheets

ANTENNA DEVICE, COMMUNICATION APPARATUS, AND METHOD OF MANUFACTURING ANTENNA DEVICE

CROSS-REFERENCE TO RELATED APPLICATIONS

The present application claims priority under 35 U.S.C. § 119 to Japanese Patent Application No. 2016-055105, filed on Mar. 18, 2016. The contents of which are incorporated herein by reference in their entirety.

BACKGROUND OF THE INVENTION

1. Field of the Invention

The present invention relates to an antenna device, a communication apparatus, and a method of manufacturing the antenna device.

2. Description of the Related Art

Magnetic coupling communication schemes typified by near field communication (NFC) are also adopted in portable information terminals such as smartphones or wearable terminals, and antennas are mounted to realize the functions. With lightness, compactness, and multi-functions of such portable information terminals, requests for miniaturizing and thinning antennas to be mounted have increased.

With miniaturization of antennas, loop antennas used in the related art are easily affected by peripheral metal. Therefore, communication distances may be shortened. On the other hand, since antennas with magnetic bodies wound by conductive wires are rarely affected by metal, it is known that communication distances increase.

In some cases, connectors are used to connect the antennas with such magnetic bodies wound by conductive wires to substrates (main substrates) on which microcomputers, NFC communication ICs, wireless power supply ICs, or the like are mounted. For example, cable relay connectors for improving workability of local area network (LAN) wires have been disclosed (see Japanese Unexamined Patent Application Publication No. 2006-269164 A).

However, a connector in Japanese Unexamined Patent Application Publication No. 2006-269164 A does not relay cables with different diameters to each other. That is, covered wires in which the diameters of lead wires of connectors are several hundreds of μm are generally used. When conductive wires which wind magnetic bodies used for antennas and have diameters of 10 μm to 100 μm are connected directly to connectors, the connectors may be moved and antenna characteristics may vary. When conductive wires used for antennas are connected to connectors, general connectors may not be used. Therefore, cost may increase. Further, when conductive wires which have thick diameters and can be connected to connectors are used, miniaturization and thinness required in smartphones, wearable terminals, or the like may not be achieved.

In view of the foregoing circumstances, there is a need to provide an antenna device, a communication apparatus, and a method of manufacturing the antenna device that realizes miniaturization and thinness and suppress variation in antenna characteristics when an antenna with a magnetic body wound with a conductive wire and a main substrate are connected by a connector.

SUMMARY OF THE INVENTION

According to exemplary embodiments of the present invention, there is provided an antenna device comprising: a plated magnetic body; a conductive wire that is wound around the magnetic body; and a substrate that relays the conductive wire and a connector.

Exemplary embodiments of the present invention also provide a communication apparatus comprising: the above-described antenna device; and a communication unit that is connected to the antenna device and communicates with outside.

Exemplary embodiments of the present invention also provide a method of manufacturing an antenna device, the method comprising: winding a conductive wire around a plated magnetic body; disposing a substrate that relays the conductive wire and a connector; and connecting the conductive wire and the connector to the substrate.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
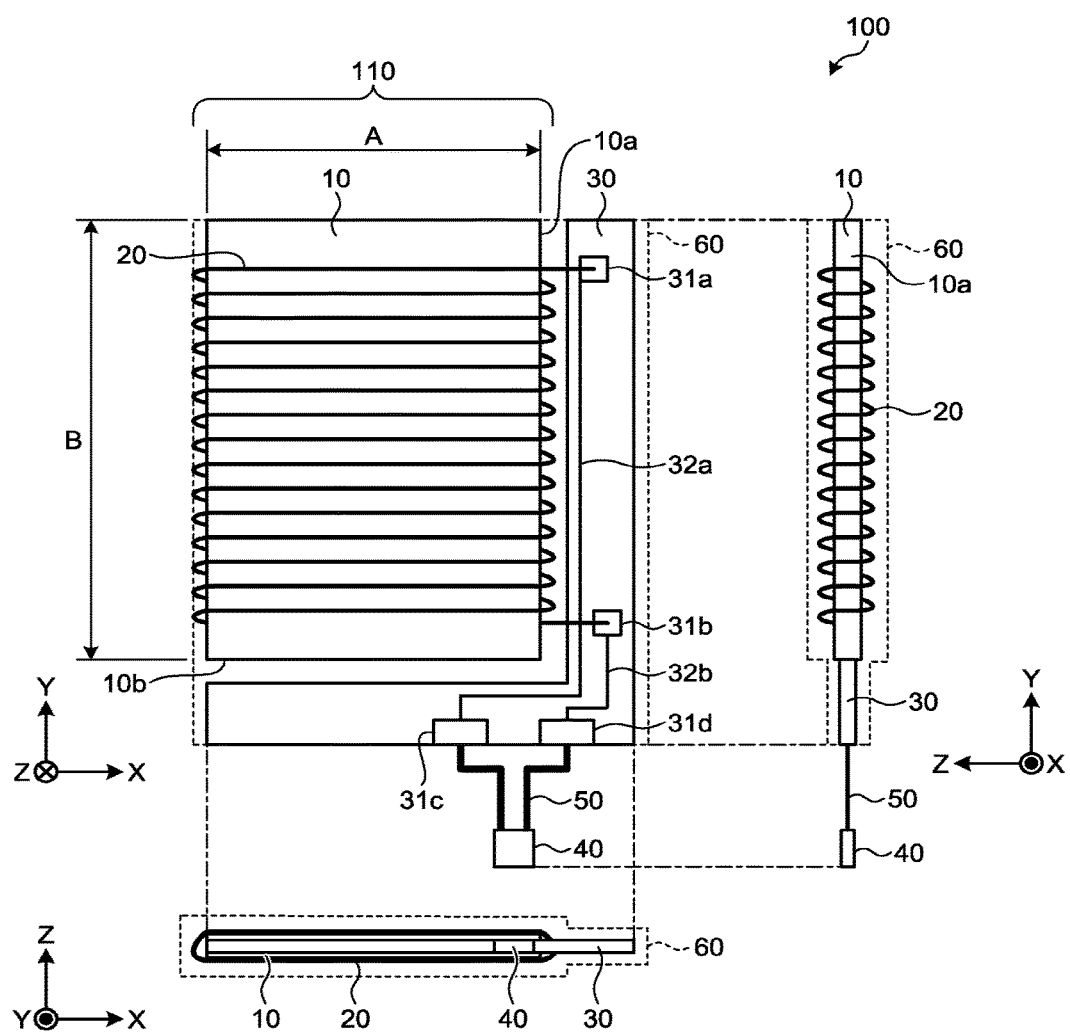
FIG. 1 is a diagram illustrating an antenna device according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the related art, when soldering is directly performed in a case in which an antenna with a magnetic body wound with a conductive wire and a main substrate on which a microcomputer, an NFC communication IC, a wireless power supply IC, or the like is mounted are connected by a wire, the number of steps of an assembling process may be necessary. When the conductive wire wound around the magnetic body is drawn up to the substrate, an LR component in which the drawn portion is unnecessary is included and communication characteristics are affected. The conductive wire is thin and disconnection may occur. In the embodiment, a case in which a connector is used to connect a main substrate to an antenna in order to resolve such a problem will be described. Further, "L" indicates inductance and "R" indicates resistance.

Embodiments of an antenna device and a method of manufacturing the antenna device will be described in detail below with reference to the appended drawings.

First Embodiment

FIG. 1 is a diagram illustrating an antenna device according to a first embodiment. In FIG. 1, the XYZ coordinate system which is a rectangular coordinate system is defined in an antenna device 100. The antenna device 100 according to the embodiment is a magnetic coupling antenna device. As illustrated in FIG. 1, the antenna device 100 mainly includes an antenna body 110 configured to include a magnetic body 10 and a conductive wire 20, a flexible printed circuits (FPC) 30, a connector 40, a lead wire 50, and a protective member 60.

The magnetic coupling antenna device is different from a resonant antenna device that transmits or receives radio waves by generating resonance and radio waves with a specific frequency. The magnetic coupling antenna device is magnetically coupled with a magnetic flux generated by an antenna device which is a communication partner to perform communication. Therefore, while a communication distance of a resonant antenna device is in the range of several meters to several kilometers, a communication distance of a magnetic coupling antenna device is, for example, equal to or less than 1 meter.

That is, the magnetic coupling antenna device is a short-range communication or near communication antenna device. The antenna device 100 illustrated in FIG. 1 transmits and receives, for example, a signal with a frequency of 13.56 MHz.

The magnetic body 10 is a rectangular sintered ferrite and has a length A of 5.3 mm in a transverse direction (X axis direction) and a length B of 8.7 mm in a longitudinal direction (Y axis direction). The size of the magnetic body 10 is an example and may be, for example, a cube in which a length A in a transverse direction (X axis direction), a length B in a longitudinal direction (Y axis direction), and a thickness (Z axis direction) are equal.

The magnetic body 10 has a plate shape. Any shape can be decided as a shape according to a size or shape of a space in which the antenna device 100 is mounted and a communication range necessary for characteristics of the antenna device 100. The magnetic body 10 is not limited to a sintered ferrite and iron, nickel, manganese, zinc, or an alloy thereof may be used as long as the magnetic body is a so-called ferromagnetic body.

The magnetic body 10 may be a member (flexible sheet) with a flexible sheet shape which has flexibility or may have a shape which can be freely changed in accordance with the shape of a casing to be mounted. The flexible sheet may be a composite magnetic body formed in a sheet shape by dispersing magnetic powders to a resin or may be a composite magnetic sheet to which a protective member is stuck to the plated magnetic body 10, in which the magnetic body 10 is divided into small pieces, and which has flexibility.

The conductive wire 20 is a wire (coil) that winds around the magnetic body 10 in the transverse direction (X axis direction) of the magnetic body 10. The conductive wire 20 is wound around the magnetic body 10 a plurality of times. In the embodiment, a winding number of the conductive wire 20 is 12 times (12 turns). In the embodiment, an interval (coil interval) between the adjacent conductive wires 20 is 0.56 mm. For example, a copper wire can be used as the conductive wire 20. The winding number of the conductive wire 20 and the interval between the conductive wires according to the embodiment are merely examples. For example, when the size of the antenna device, that is, the size of the magnetic body, is changed, the winding number of the conductive wire or the interval between the conductive wires can be appropriately set. End portions on both sides of the conductive wire 20 are connected to pads 31a and 31b of the FPC 30.

The FPC 30 is a printed wiring substrate that has a structure which can be bent using a thin insulation material, has an L shape in the embodiment, and is disposed at a position facing two intersecting surfaces of the magnetic body 10 of the antenna body 110. Specifically, in the embodiment, the FPC 30 with the L shape is disposed at a position facing a side surface 10a and a bottom surface 10b of the magnetic body 10 which intersect each other in a plan view of the magnetic body 10 illustrated in FIG. 1. The FPC 30 is an example of a substrate.

The FPC 30 is a substrate that relays the conductive wire 20 to the connector 40 and is connected to the conductive wire 20 and a lead wire 50 connected to the connector 40. Specifically, the end portions of the conductive wire 20 are connected to the pads 31a and 31b of the FPC 30. Wires 32a and 32b connected to the pads 31a and 31b are connected to pads 31c and 31d of the FPC 30, respectively, and are consequently connected to the lead wire 50 connected to the pads 31c and 31d.

The connector 40 is a connection component for electrically connecting certain functions to each other. In the embodiment, the connector 40 is a connection component which is connected to the lead wire 50 connected from the antenna body 110 via the FPC 30 and is connected to a main substrate.

The lead wire 50 is a covered wire connected to the pads 31c and 31d of the FPC 30 and the connector 40 and is, for example, a conductive wire in which a plurality of copper wires are covered with rubber (covered vinyl). The lead wire 50 according to the embodiment is a covered wire that has a diameter different form the conductive wire 20, that is, is larger than the diameter of the conductive wire 20. The lead wire 50 is an example of a covered wire.

Here, the FPC 30 will be further described. The conductive wire 20 wound around the magnetic body 10 of the antenna body 110 is equal to or less than 0.1 mm in many cases. The lead wire 50 of the connector 40 is designated as a covered wire equal to or greater than 0.25 mm in many cases. Accordingly, when the connector 40 is connected directly to the antenna body 110, conversion from the conductive wire 20 equal to or less than 0.1 mm to the lead wire 50 equal to or greater than 0.25 mm is necessary. Accordingly, in the embodiment, conversion from the conductive wire 20 of the antenna body 110 to the lead wire 50 is performed by relaying the FPC 30, so that the antenna body 110 is connected to the connector 40. Then, the antenna body 110 is connected to the main substrate via the connector 40 so as to be connected to a communication unit of an apparatus performing communication using the antenna body 110, so that the communication unit can communicate with an external apparatus.

The protective member 60 is a member that laminates the FPC 30 and the magnetic body 10 wounded by the conductive wire 20 for protection and is, for example, a polyester film. In the embodiment, as indicated by a dotted line of FIG. 1, the antenna body 110 and the FPC 30 are covered with the protective member 60 to be laminated. Thus, by fixing the antenna body 110 and the FPC 30, it is possible to protect the conductive wire 20 against an impact or it is possible to protect the conductive wire 20 when the antenna device 100 is bent. Further, by fixing the position of the conductive wire 20 to the magnetic body 10, it is possible to prevent deviation of an equivalent LCR (equivalent circuit) of the antenna body 110. To understand characteristics of the antenna device, the antenna device is viewed to be equivalent to a circuit (LCR) when the antenna device is regarded as a resonator. "C" indicates capacitance.

Figure 2:
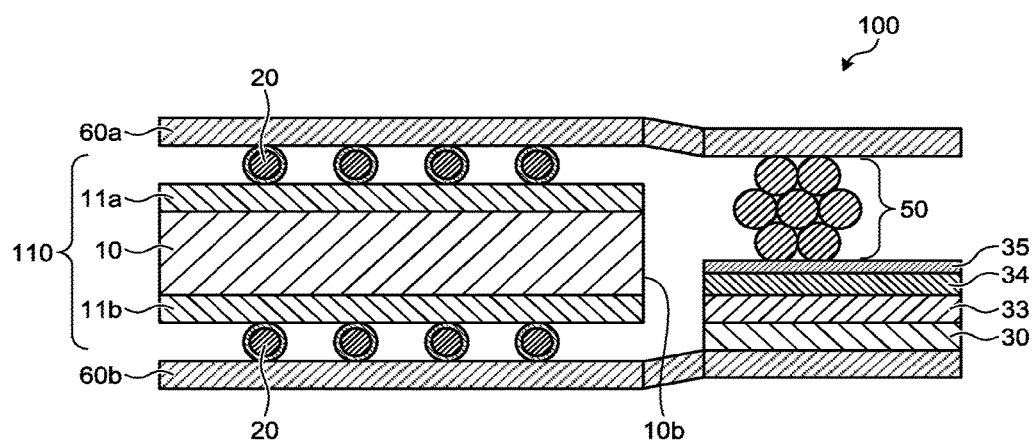
FIG. 2 is a diagram illustrating the height of each layer of the antenna device according to the first embodiment.

FIG. 2 is a diagram illustrating the height of each layer of the antenna device according to the first embodiment. In a wearable terminal, a smartphone, or the like, an antenna device is required to be miniaturized and thinned. Accordingly, when a thickness is sufficient, an FPC can also be formed on a magnetic body (ferrite) and a lead wire for a connector can be extracted from the FPC. When a thickness is not sufficient, the FPC 30 is disposed transversely with the antenna body 110, as in FIG. 2, and the lead wire 50 connected to the connector 40 is extracted from the FPC 30.

On the left side of FIG. 2, the height of the antenna body 110 is illustrated. In the magnetic body 10 of the antenna body 110, a protective member 11a of a polyester film is adhered to the upper portion and a protective member 11b of a polyester film is adhered to the lower portion. The magnetic body 10 to which the protective members 11a and 11b are adhered is wound by the conductive wire 20.

On the right side of FIG. 2, the heights of the FPC 30 and the lead wire 50 are illustrated. The FPC 30 is disposed at a position facing the bottom surface 10b of the magnetic body 10. An adhesive layer 33, a copper foil 34, and a resist 35 are adhered to the upper portion of the FPC 30 and the lead wire 50 is disposed on the upper portion.

A protective member 60a of a polyester film from the upper side of the antenna body 110 and the FPC 30 in FIG. 2 and a protective member 60b from the lower side are laminated to protect the antenna device 100.

A peripheral circuit may be mounted on the FPC 30. For example, a capacitor for resonance adjustment, a resistor for Q value adjustment, or an LCR for matching may be mounted as the peripheral circuit. Thus, it is possible to simplify the main substrate and adjust a variation in the antenna device 100.

That is, the capacitor for resonance adjustment has a role of adjusting inductance of the antenna device or a resonant frequency expressed as Freq=$1/2\pi\sqrt{(L\cdot C)}$. Here, Freq is near 13.56 MHz which is a carrier frequency in NFC. A resistor for Q value adjustment is expressed as Q=$\omega$L/R. For example, for transmission power, when a Q value is high, a spectrum peak is high and a half value width is narrowed. When the Q value is low, the spectrum peak is low and the half value width is broadened. However, when the Q value is high, stronger power can be transmitted at desired frequency. However, the desired frequency is not suitable, the power may be lost. Accordingly, in fact, the Q value is generally adjusted to a certain range. For the LCR for matching, L is used in some case as well as C and R. This is used to match impedance of the IC and the antenna device. By mounting the peripheral circuit on the side of the FPC 30 of the antenna device 100 rather than the main substrate, the variation in the equivalent LCR at the time of manufacturing the antenna can be covered with the peripheral circuit.

The antenna device 100 is manufactured as follows. First, the antenna body 110 is generated by winding the conductive wire 20 around the plated magnetic body 10. Then, the L-shaped FPC 30 relaying the conductive wire 20 and the connector 40 is disposed and the lead wire 50 connected to both end portions of the conductive wire 20 and the connector 40 is connected to the FPC 30. Then, the antenna body 110 and the FPC 30 are covered horizontally and vertically with the protective member 60 to be laminated.

In this case, when the antenna body 110 in which the magnetic body 10 is wound by the conductive wire 20 is connected to the main substrate by the connector 40 in the antenna device 100 according to the embodiment, the L-shaped FPC 30 relaying the antenna body 110 and the connector 40 is disposed near the antenna body 110. Thus, it is possible to perform conversion from the narrow conductive wire 20 with 10 µm to 100 µm used in the antenna body 110 to the thick lead wire 50 with about several hundreds of µm crimped and pressed against the connector 40. Therefore, when the antenna body 110 and the main substrate are connected by the connector 40, it is possible to suppress the variation in the antenna characteristics, suppress cost, and realize miniaturization and thinness.

Second Embodiment

In the first embodiment, the L-shaped FPC is configured to be disposed near the antenna body to relay the antenna body and the connector. In the second embodiment, however, an FPC that has an opening is disposed below an antenna body to relay the antenna body and the connector.

Figure 3:
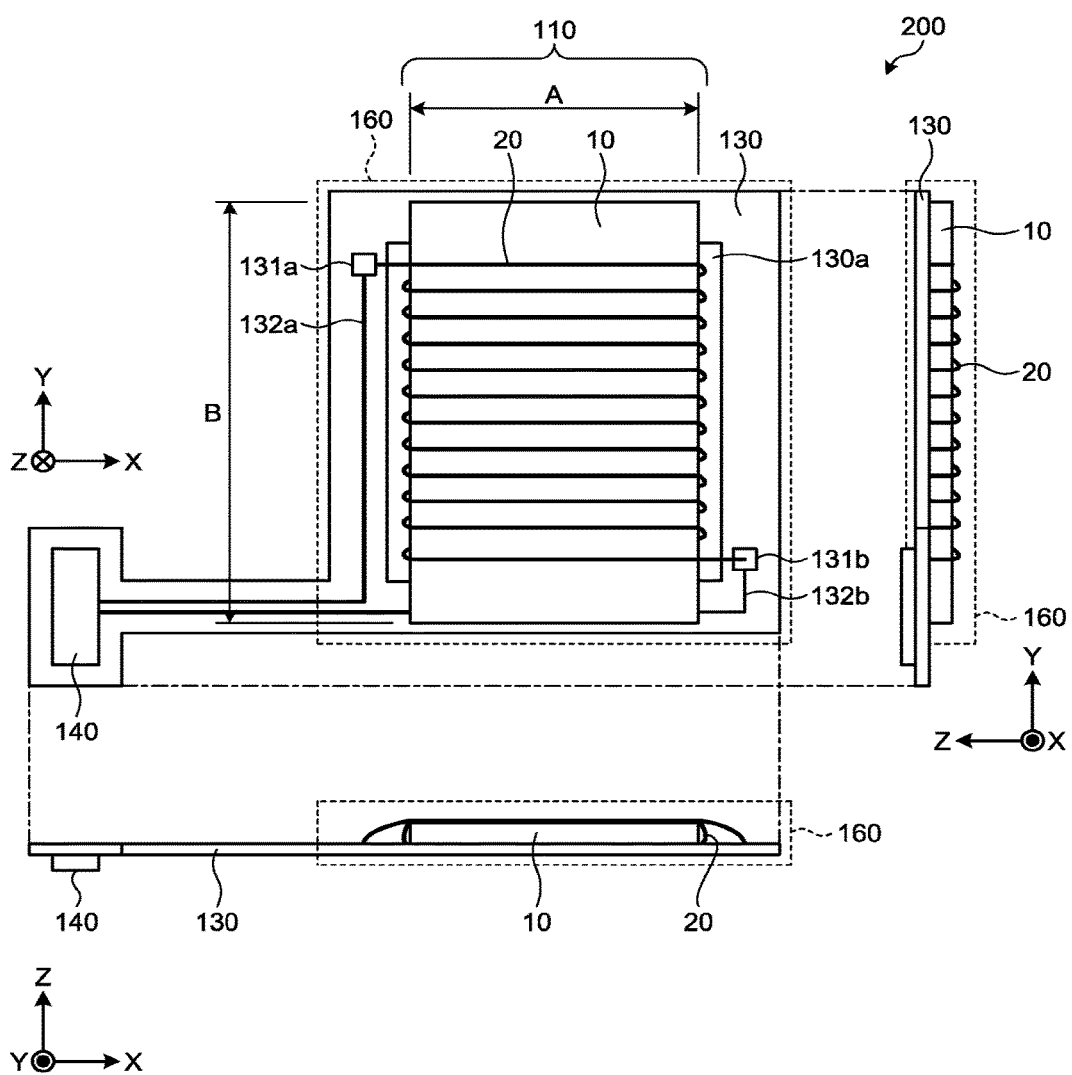
FIG. 3 is a diagram illustrating an antenna device according to a second embodiment.

FIG. 3 is a diagram illustrating an antenna device according to a second embodiment. In FIG. 3, as in FIG. 1, the XYZ coordinate system which is a rectangular coordinate system is defined in an antenna device 200. The antenna device 200 according to the embodiment is a magnetic coupling antenna device. As illustrated in FIG. 3, the antenna device 200 mainly includes an antenna body 110 configured to include a magnetic body 10 and a conductive wire 20, an FPC 130, a connector 140, and a protective member 160. Here, the magnetic body 10 and the conductive wire 20 are the same as those of the first embodiment, and thus will not be described.

As in the first embodiment, the FPC 130 is a printed wiring substrate. In the second embodiment, the FPC 130 includes a square opening 130a. The opening 130a is disposed to be located below the magnetic body 10 of the antenna body 110. Specifically, as illustrated in FIG. 3, the FPC 130 according to the second embodiment is configured by a squared substrate including the opening 130a, and a rectangular substrate to which an end portion extended from one side of the squared substrate is unified and on which the connector 140 is applied. The FPC 130 is an example of a substrate.

The FPC 130 is a substrate that relays the conductive wire 20 and the connector 140 and is connected to the conductive wire 20 and the connector 140 which can be surface-mounted. Specifically, end portions of the conductive wire 20 are connected to pads 131a and 131b of the FPC 130, and wires 132a and 132b connected to the pads 131a and 131b are connected to the surface-mounted connector 140.

In the second embodiment, the connector 140 is a surface-shaped connection component which is connected to the FPC 130 connected to the antenna body 110 and is connected to a main substrate. The connector 140 according to the second embodiment can be surface-mounted on the FPC 130, and thus can be connected directly to the FPC 130 without involving the lead wire 50 according to the first embodiment.

The protective member 160 is a member that laminates the magnetic body 10 wound by the conductive wire 20 and the FPC 130 for protection, and is, for example, a polyester film as in the first embodiment. In the embodiment, as indicated by a dotted line in FIG. 3, the antenna body 110 and the squared substrate of the of the FPC 130 are covered with the protective member 160 to be laminated. Thus, by fixing the antenna body 110 and the FPC 130, it is possible to protect the conductive wire 20 against an impact or it is possible to protect the conductive wire 20 when the antenna device 200 is bent. Further, by fixing the position of the conductive wire 20 to the magnetic body 10, it is possible to prevent deviation of an equivalent LCR (equivalent circuit) of the antenna body 110.

A peripheral circuit may be mounted on the FPC 130 as in the first embodiment. The FPC 130 may be formed in an L shape to be disposed as in the first embodiment. In this case, a rectangular substrate on which the connector 140 can be surface-mounted as in the embodiment may be at a front end formed by extending an end portion of the L-shaped substrate.

The antenna device 200 is manufactured as follows. First, the antenna body 110 is generated by winding the conductive wire 20 around the plated magnetic body 10. The FPC 130 relaying the conductive wire 20 and the connector 140 is disposed. At this time, the opening 130a of the FPC 130 is disposed to be located below the magnetic body 10. Then, both end portions of the conductive wire 20 are connected to the FPC 130 and the connector 140 is surface-mounted to be connected. Then, the antenna body 110 and the FPC 130 are covered horizontally and vertically with the protective member 160 to be laminated.

In this case, when the antenna body 110 in which the magnetic body 10 is wound by the conductive wire 20 is connected to the main substrate by the connector 140 in the antenna device 200 according to the embodiment, the FPC 130 relaying the antenna body 110 and the connector 140 is disposed near the antenna body 110. Thus, it is possible to perform conversion from the narrow conductive wire 20 with 10 μm to 100 μm used in the antenna body 110 to the connector 140. Therefore, when the antenna body 110 and the main substrate are connected by the connector 140, it is possible to suppress the variation in the antenna characteristics, suppress cost, and realize miniaturization and thinness.

In the antenna device 200 according to the second embodiment, the FPC 130 has a squared shape that has the opening 130a, and the opening 130a is disposed to be located below the magnetic body 10. Thus, since the magnetic body 10 can be connected to the FPC 130 in a stable state, the rigidity of the magnetic body 10 can be improved as the antenna device 200.

In the antenna device 200 according to the second embodiment, the connector 140 which can be surface-mounted on the FPC 130 is used. Accordingly, direct connection from the conductive wire 20 to the connector 140 via a pattern (wire) of the FPC 130 is realized without using the lead wire as in the first embodiment. In the lead wire, an interval between the wires or a length is easily deviated than in the wire of the FPC 130. The length may affect an R (resistance) component, and the interval may affect L (instance) and C (capacitance) components. Therefore, in the antenna device 200 according to the second embodiment in which no lead wire is used, it is possible to suppress a variation in the LCR when a lead wire is used.

In the antenna device 200 according to the second embodiment, the connector 140 is formed in a planar shape. Therefore, since the connector 140 is thinner than a connector in which a lead wire is used, the antenna device 200 can be thinned. Further, it is necessary to mount a connector in which a lead wire is used by a hand. However, the connector 140 which can be surface-mounted as in the second embodiment can be mounted in accordance with the same method as that of a chip component such as a normal resistor or capacitor. Therefore, it is possible to simplify steps when the connector 140 is soldered to the FPC 130.

According to the aspect of the invention, it is possible to obtain advantages capable of realizing miniaturization and thinness and suppressing a variation in antenna characteristics.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

What is claimed is:

1. An antenna device comprising:
   a plated magnetic body;
   a conductive wire that is wound around the plated magnetic body;
   a printed wiring substrate that relays the conductive wire and a connector; and
   a covered wire that is connected to the printed wiring substrate and has a diameter different from a diameter of the conductive wire,
   wherein first and second end portions of the conductive wire are respectively connected to first and second pads of the printed wiring substrate,
   wherein the first and second pads of the printed wiring substrate are electrically connected to the connector, and
   wherein the connector is connected to the covered wire.

2. The antenna device according to claim 1, wherein the connector is mounted on a surface of the printed wiring substrate.

3. The antenna device according to claim 1, wherein the plated magnetic body has a rectangular shape, and the printed wiring substrate has an L shape and is disposed at a position facing two intersecting surfaces of the plated magnetic body.

4. The antenna device according to claim 1, wherein the printed wiring substrate has an opening and is disposed so that the opening is located below the plated magnetic body.

5. The antenna device according to claim 1, further comprising:
   a protective member that covers and protects the plated magnetic body wound by the conductive wire and the printed wiring substrate.

6. The antenna device according to claim 1, wherein a peripheral circuit is mounted on the printed wiring substrate.

7. The antenna device according to claim 1, wherein the plated magnetic body is a flexible sheet.

8. A method of manufacturing an antenna device, the method comprising:
   winding a conductive wire around a plated magnetic body;
   disposing a printed wiring substrate that relays the conductive wire and a connector;
   connecting first and second end portions of the conductive wire to first and second pads of the printed wiring substrate;
   connecting the first and second pads of the printed wiring substrate to the connector;

connecting a covered wire to the printed wiring substrate, the covered wire having a diameter different from a diameter of the conductive wire; and
connecting the connector to the covered wire.

\* \* \* \* \*